US008468178B2

(12) United States Patent
Cannon et al.

(10) Patent No.: US 8,468,178 B2
(45) Date of Patent: Jun. 18, 2013

(54) PROVIDING LOCATION BASED INFORMATION IN A VIRTUAL ENVIRONMENT

(75) Inventors: Ulysses L. Cannon, Durham, NC (US); Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 12/185,990

(22) Filed: Aug. 5, 2008

(65) Prior Publication Data
US 2010/0036823 A1 Feb. 11, 2010

(51) Int. Cl.
*G06F 17/30* (2006.01)
(52) U.S. Cl.
USPC .......................................... 707/803; 715/757
(58) Field of Classification Search
USPC .......................................... 707/803; 715/757
See application file for complete search history.

(56) References Cited

U.S. PATENT DOCUMENTS

| 6,307,573 | B1 * | 10/2001 | Barros | 715/764 |
| 7,028,253 | B1 * | 4/2006 | Lieberman et al. | 715/232 |
| 7,149,776 | B1 * | 12/2006 | Roy et al. | 709/205 |
| 7,206,813 | B2 * | 4/2007 | Dunbar et al. | 709/206 |
| 7,509,386 | B2 * | 3/2009 | Miyashita | 709/207 |
| 7,840,639 | B1 * | 11/2010 | Gough | 709/206 |
| 7,970,837 | B2 * | 6/2011 | Lyle et al. | 709/206 |
| 2001/0016845 | A1 * | 8/2001 | Tribbensee | 707/10 |
| 2003/0174178 | A1 * | 9/2003 | Hodges | 345/848 |
| 2005/0267896 | A1 * | 12/2005 | Goodman et al. | 707/10 |
| 2006/0200662 | A1 * | 9/2006 | Fulton et al. | 713/164 |
| 2006/0271520 | A1 * | 11/2006 | Ragan | 707/3 |
| 2007/0011273 | A1 * | 1/2007 | Greenstein et al. | 709/217 |
| 2007/0100939 | A1 * | 5/2007 | Bagley et al. | 709/204 |
| 2007/0168448 | A1 * | 7/2007 | Garbow et al. | 709/207 |
| 2008/0015024 | A1 * | 1/2008 | Mullen | 463/42 |
| 2008/0162528 | A1 * | 7/2008 | Jariwala | 707/102 |
| 2008/0263460 | A1 * | 10/2008 | Altberg et al. | 715/757 |
| 2008/0320041 | A1 * | 12/2008 | Engelsma et al. | 707/104.1 |
| 2009/0113314 | A1 * | 4/2009 | Dawson et al. | 715/757 |
| 2009/0158200 | A1 * | 6/2009 | Palahnuk et al. | 715/781 |

* cited by examiner

*Primary Examiner* — Robert Beausoliel, Jr.
*Assistant Examiner* — Noosha Arjomandi
(74) *Attorney, Agent, or Firm* — Fleit Gibbons Gutman Bongini & Bianco PL; Thomas Grzesik; Jose Gutman

(57) ABSTRACT

A method, information processing system, and virtual environment, provide location information to users in the virtual environment. A first user is determined to be communicating with a second user in a virtual environment. One of the first user and the second user is determined to have entered a character set substantially matching a keyword in a database entry. Location information associated with the keyword is identified. The location information indicates a location within the virtual environment. The location information is linked to the character set. The character set is visually changed to indicate to the first user and the second user that location information has been linked to the character set.

17 Claims, 8 Drawing Sheets

| USER ID | KEY WORDS | LOCATION INFORMATION | FORMAT | REGION | RELOCATION INDICATOR | SECURITY | |
|---------|-----------|----------------------|--------|--------|----------------------|----------|---|
| USER 1 | HOME | http://www.....com/(40, 58, 65) | UNDERLINE | REGION A | GO | PUBLIC | ... |
| | KITCHEN | ... | BOLD; BLUE; UNDERLINE | ... | "!" | USER 100 USER 59 | ... |
| | ART GALLERY | ... | ... | ... | ... | ... | ... |
| | SCHOOL | ... | ... | ... | ... | ... | ... |
| | LIBRARY | http://www.....com/(60, 12, 88) | ... | REGION X | ... | USER GROUP 2 | ... |
| | LIBRARY | http://www.....com/(71, 22) | ... | REGION Y | ... | ... | ... |

FIG. 2

| REGION ID | KEY WORDS | LOCATION INFORMATION | FORMAT | ... |
|---|---|---|---|---|
| REGION A | PAINTING 1 ⋮ SCULPTURE | http://www.....com/(40, 58, 65) | HOVER; BOLD | ... |
| ⋮ | ⋮ | ⋮ | ⋮ | ⋮ |
| REGION YY | PARROT ⋮ ELEPHANT | http://www.....com/(49, 99) | BOLD; RED; FLASHING | ... |

PROVIDING LOCATION BASED INFORMATION IN A VIRTUAL ENVIRONMENT

FIELD OF THE INVENTION

The present invention generally relates to the field of virtual environments, and more particularly relates to providing location based information to users of a virtual environment.

BACKGROUND OF THE INVENTION

Virtual environments generally provide maps to users so that the users can navigate to various locations within the environment. A user is able to obtain coordinate information for various locations and transport his/herself to the location. However maps are not the most efficient method to find a location within a virtual environment. A more efficient way to find a location is to ask other users in the virtual environment how to get to a specific location. Conventional virtual environments allow users to pass links to one another that contain location information for a particular place within the virtual environment. When a user selects the link, the user is taken to the location associated with the link. However, one problem with this conventional user of links is that the user who passes the link to another user is required to be in the location associated with that link or is required to obtain the link from a map. This conventional use of links does not provide a natural way of obtaining location information.

SUMMARY OF THE INVENTION

In one embodiment, a method for providing location information to users in the virtual environment is disclosed. A first user is determined to be communicating with at least a second user in a virtual environment. One of the first user and the at least second user is determined to have entered a character set substantially matching a keyword in a database entry. Location information associated with the keyword is identified. The location information indicates a location within the virtual environment. The location information is linked to the character set. The character set is visually changed to indicate to the first user and the at least second user that location information has been linked to the character set.

In another embodiment, an information processing system for providing location information to users in the virtual environment is disclosed. The information processing system includes a memory and a processor communicatively coupled to the memory. The information processing system further includes at least a portion of a virtual environment and a user interaction manager communicatively coupled to the memory, the processor, and the at least a portion of the virtual environment. The user interaction manager is adapted to determine a first user is communicating with at least a second user in a virtual environment. One of the first user and the at least second user is determined to have entered a character set substantially matching a keyword in a database entry. Location information associated with the keyword is identified. The location information indicates a location within the virtual environment. The location information is linked to the character set. The character set is visually changed to indicate to the first user and the at least second user that location information has been linked to the character set.

In another embodiment, a virtual environment is disclosed. The virtual environment includes a first user, at least a second user, and a user interaction manager that is communicatively coupled to the first user and the at least second user. The user interaction manager is adapted to determine a first user is communicating with at least a second user in a virtual environment. One of the first user and the at least second user is determined to have entered a character set substantially matching a keyword in a database entry. Location information associated with the keyword is identified. The location information indicates a location within the virtual environment. The location information is linked to the character set. The character set is visually changed to indicate to the first user and the at least second user that location information has been linked to the character set.

An advantage of the various embodiments of the present invention is that users of a virtual environment are able to retrieve location information in a natural way. A user is not required to obtain location information via a map. A user can send location information to another user during a chat session. Character sets within the communication session are visually changed and linked with location information. A user is then able to select the character set to be transported to the location associated with the location information.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 is one example of an associative lookup entry according to one embodiment of the present invention;

FIG. 3 is another example of an associative lookup entry according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Operating Environment

Figure 1:
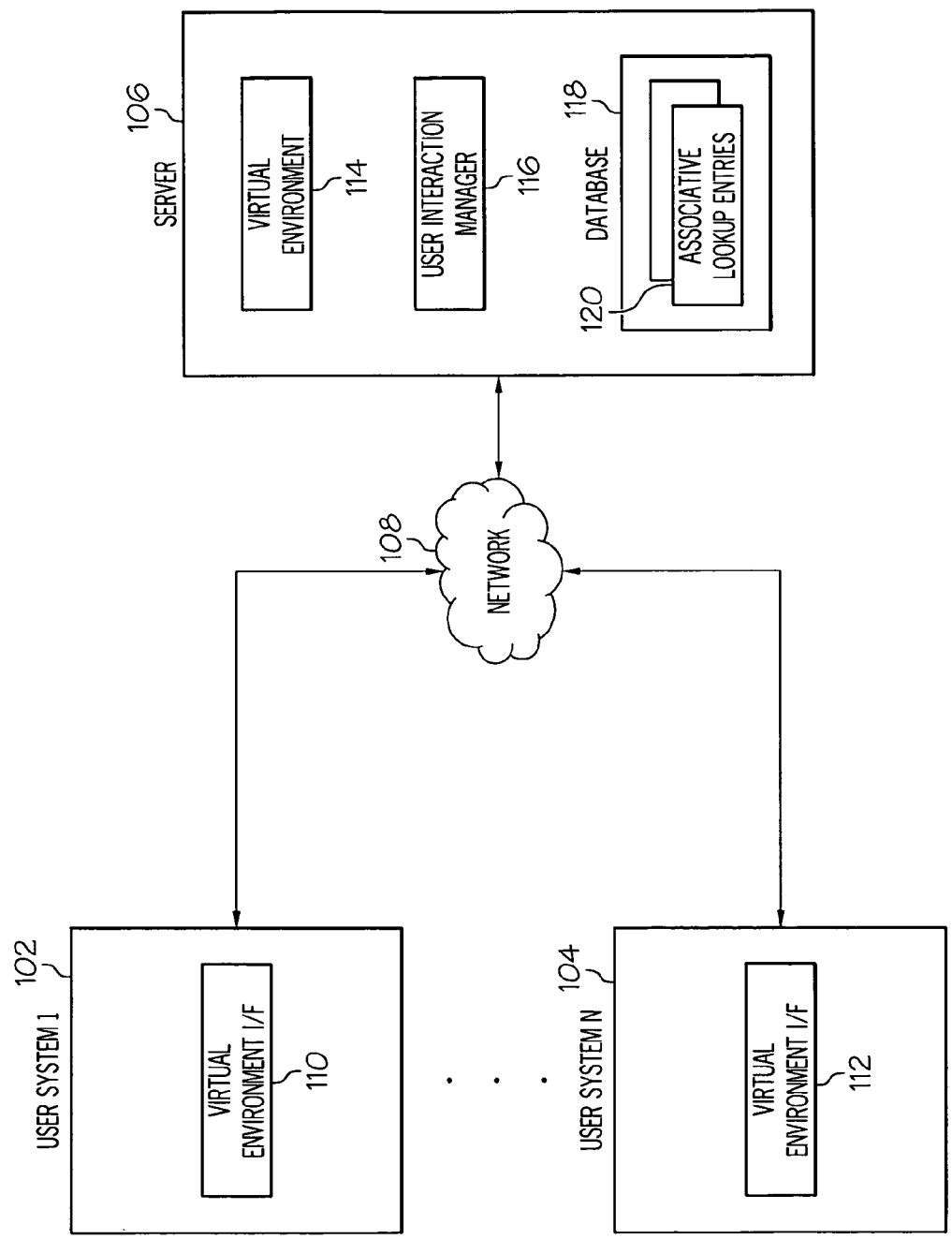
FIG. 1 is a block diagram illustrating a general overview of an operating environment according to one embodiment of the present invention.

According to one embodiment of the present invention as shown in FIG. 1 a general overview of an operating environment 100 is illustrated. In particular, the operating environment 100 includes one or more information processing systems 102, 104, 106 communicatively coupled to each other through one or more networks 108. The one or more networks can comprise can comprise wired and/or wireless technologies. The information processing systems 102, 104, 106 can include one or more user systems 102, 104 and one or more servers 106.

Each of the user systems 102, 104 include a virtual environment interface 110, 112 that allows a user to interact with a virtual environment 114 provided by the one or more servers 106. The virtual environment 114 can be a virtual community, a virtual gaming environment, or the like. The virtual environment interface 114, in one embodiment, is a web-based interface that allows a user to interact with the virtual environment 114. The server 106, in one embodiment, includes the virtual environment 114, a user interaction manager 116, and a database 118 that includes associative lookup entries 12-. The virtual environment interface 110, 112, virtual environment 114, user interaction manager 116, and database 118 (and its components) are discussed in greater detail below.

It should be noted that although the virtual environment 114, user interaction manager 116, and database 118 are shown residing on a single information processing system one or more of these components can reside on other information processing systems as well.

Providing Location Based Information in a Virtual Environment

As discussed above, a virtual environment 114 (also referred to as a Virtual Universe) can be a virtual community, a virtual gaming environment, and the like. A virtual environment 114 is a computer-based simulated environment that allows users (the inhabitants of the virtual environment 114) to traverse, inhabit, and interact with one another and the environment itself using graphical representations of the user. One common graphical representation of a user is an AVATAR. A virtual environment 114 can be represented using 2-D or 3-D graphics and landscapes. Often, a virtual environment 116 resembles the real world in terms of physics, houses, buildings, landscapes, and the like.

Users are generally associated with an agent/user account for the virtual environment 114. The account associated with a user allows the user to create an AVATAR, update personal information, track and manage assets that the user owns within the virtual worlds, and the like. For example, a user can own a house, business, pet, and the like. A house can include appliances, paintings, furniture and anything else that a house can include in the real world. A user's account can maintain an inventory of these items. Each user, each item that a user owns, every location that a user can travel to, or anything visual within the virtual environment is associated with a unique identifier.

A unique identifier allows these users, items, and locations to be distinguished from one another. These unique ideas are associated with geometric data such as coordinates. These coordinates are passed to users in a textual form so that the users can navigate to that item/location. The unique identifiers can also be associated with textures that are distributed to users as graphic files, and effects data, which are rendered by the virtual environment interface of the user and the user's preferences and device capabilities.

Virtual environments 114 generally provide maps to users so that the users can navigate to various locations within the virtual environment 114. A user is able to obtain coordinate information for various locations and transport his/herself to the location. However, as discussed above, maps are not the most efficient method to find a location within a virtual environment 114. A more efficient way to find a location is to ask other users in the virtual environment 114 how to get to a specific location. Conventional virtual environments allow users to pass links to one another that contain location information for a particular place within the virtual environment 114. When a user selects the link, the user is taken to the location associated with the link. However, one problem with this conventional use of links is that the user who passes the link to another user is required to be in the location associated with that link or is required to obtain the link from a map. This conventional use of links does not provide a natural way of obtaining location information.

Therefore, embodiments of the present invention direct users to specific locations in the virtual environment 114 using natural language. Users are able to create associative lookup entries 120 in the database 118 that associate various keywords with links to locations within the virtual environment 114. These tables/entries 120 of keywords can be associated with a particular user (via the user's graphical representation) or a particular region within the virtual environment 114. During a chat session with another user, whenever a user types a character set such as a word or phrase corresponding to a keyword in an associative lookup entry 122, that character set becomes linked (e.g., hyperlinked) to the location information associated with the keyword. When a user selects the hyperlinked character set, the user is transported to the location associated with the character set.

FIG. 2 and FIG. 3 show different examples of entries within the database 118 that associated location based information to various keywords. In the example of FIG. 2, the associative lookup entry 220 is a table that has been created by a user having the unique identifier "User 1". In an embodiment where a specific user has created an associative lookup entry 220, each time that user chats with another user and types a character set that is within the associative lookup entry 220, that particular character set is hyperlinked with corresponding location based information. The other user is able to select the hyperlinked character set and be transported to the location associated with the location based information.

For example, the associative lookup entry 220 of FIG. 2 includes a first column 222 that includes user identification information such as entry 224 displaying "User 1". This column 222 indicates the identity of the user that has created the table 220. A second column 226 includes entries 228 that list multiple keywords that the user has defined. For example, entry 228 includes the keyword "home". This column 226 is used by the user interaction manager 116 at the server 106 to identify any character sets that are to be acted upon during a chat session.

Each keyword 228 is associated with corresponding location information 230 under a location information column 232. This location information 230 comprises the necessary information for the user interaction manager 116 to transport a user to the location associated with the information. In one embodiment, the location information has the format of a URL, as shown in FIG. 2. However, it should be noted that the present invention is not limited to such an embodiment. The example of FIG. 2 shows, for example in entry 230, a URL that includes X, Y, and optionally Z coordinates in the format of (40, 58, 65). These coordinates correspond to a location within the virtual environment 114. The Z coordinate is optional as shown in entry 234 where only the X and Y coordinates (71, 22) are given.

The user can also define how a keyword is to visually change to notify another user (or the user his/herself) that location based information has been hyperlinked to a character set. For example column 236 includes entries 238 with format information that indicates to the user interaction manager 116 how to visually change a character set associated with a keyword in the table 220. Entry 238 in particular indicates that the character set "home" is to be underlined during a chat session when the user interaction manager 116 detects the character set "home". It should be noted that a character set can be visually changed in any manner as long as a user is able to notice the character set is different from at least most of the other displayed character sets.

A user can also associate regions to keywords as well. For example, column 240 includes entries 242 that associated a particular region or regions to a given keyword. This allows a single keyword such as "library" to be associated with different locations as shown in FIG. 2. For example, FIG. 2 shows that the keyword "library" is associated with a location of http://www . . . .com/(60, 12, 88) when the user is in Region X and is associated with the location of http://www . . . .com/(71, 22) when the user is in Region Y. This is advantageous because there may be a different library in Region X than in Region Y.

FIG. 2 also shows another column 244 that includes relocation indicator entries 246. These entries 244, 246 include a character set that can includes letters, numbers, symbols, or a combination of thereof. When a user utilizes a relocation indicator before and/or after one or the keywords, the user interaction manager 116 is instructed to transport both User 1, who is associated with the table 200 in this example, and the other user communicating with the User 1 to the location associated with the keyword when the other user selects the hyperlinked character set. For example, during a conversation with another user, User 1 can type "Hi Jane, would you like to meet me at my go home?". The relocation indicator "go", in this example, indicates to the user interaction manager 116 that when the other user clicks the character set "home", which has been hyperlinked with corresponding location information, both User 1 and the other user are transported to the location associated with "home". This is compared to not using a relocation indicator and transporting only the other user or any user that clicks the hyperlinked character set "home" to the location associated with "home". It should be noted that in one embodiment, the relocation indicator is not displayed to the second user. For example, the second user only sees "Hi Jane, would you like to meet me at my home?" without the relocation indicator "go".

A user can also indicate users or groups or users that the hyperlinking function is to be applied to. For example, a user may not want keywords linked with location information when communicating with certain users or a group of users. In this situation, the user can specify which users, groups of users, or user groups the linking functions are enabled (or disabled for. For example, FIG. 2 shows a security column 250 including entries 252 indicating which users the linking function is enabled for.

Similarly, the entries can indicate users that the linking function is disabled for. Entry 252 shows "public", which indicates that the linking function for keyword "home" is enabled for all users. However, entry 252 shows that the linking function for keyword "kitchen" is only enabled for users User 100 and User 59. It should be noted that instead of having to list users for each keyword, the user can globally enable/disable the linking function for all keywords for every user or listed users. It should also be noted that the presently claimed invention is not limited to the columns and entries shown in FIG. 2. On or more columns/entries can be added and/or deleted as well.

FIG. 3 shows another example of an associative lookup entry/table 320. In particular, FIG. 3 shows an associative lookup entry/table 320 comprising a column 322 with entries 324, 326 identifying a particular region within the virtual environment 114. For example, entry 324 identifies Region A and entry 326 identifies Region YY. Therefore, the associative lookup entry/table 320 of FIG. 3 is associated with particular regions within the virtual environment 114 as compared to particular users, as shown in FIG. 2. However, a user can setup the associative lookup entry/table 320 for one or more regions. For example, Region A may correspond to an art gallery owned by a user. This user can setup this associative lookup entry/table 320 with respect to the art gallery, or Region A. However, creators or administrators of a region can also create the associative lookup entry/table 320 with respect to one or more regions.

Each region is associated with multiple keywords 328 listed under the keyword column 326. For example, Region A is associated with keywords such as a title of a painting, a title of a sculpture, and the like. Each of these keywords 328 are associated with location information 330 under the location information column 332 as discussed above with respect to FIG. 2. For example, a keyword(s) 328 relating to a title of a painting is associated with the location information http://www . . . .com/(40, 58, 65). When a user is within Region A and types "The Starry Night" this character set is linked to the location http://www . . . .com/(40, 58, 65) and is visually changed as discussed above. In one embodiment, the user can be transported to the location of the painting "The Starry Night" in Region A when the user clicks on the linked character set "The Starry Night". However, in another embodiment information about the painting "The Starry Night" can be displayed to the user when the user hovers the cursor over the linked character set "The Starry Night".

For example, FIG. 3 shows that the format 338 of the link under the Format 336 heading is "hover" and "bold". This instructs the user interaction manager 116 to bold the character set "The Starry Night" when a user enters it during a communication session. The "hover" format instructs the user interaction manager 116 to display information such as information about the painting's author, the location information associated with the painting, and the like to the user when the user hovers his/her cursor over the character set. It should be noted that a character set can also be visually changed using animation as well. For example, entry 339 shows that a "flashing" effect is to be applied to the character set "parrot".

Figure 4:
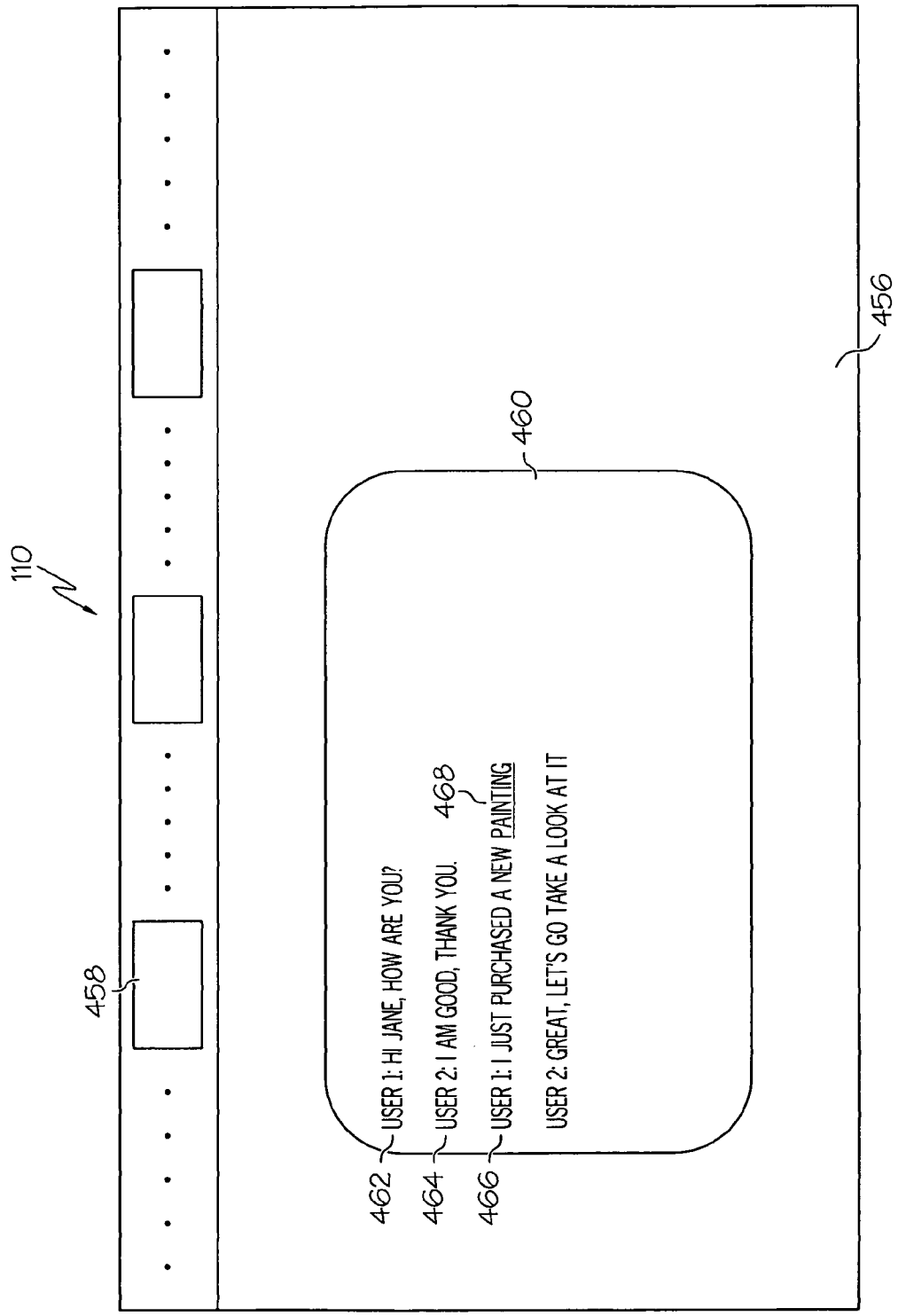
FIG. 4 is a block diagram of virtual environment user interface for providing location information to a user according to one embodiment of the present invention.
Figure 5:
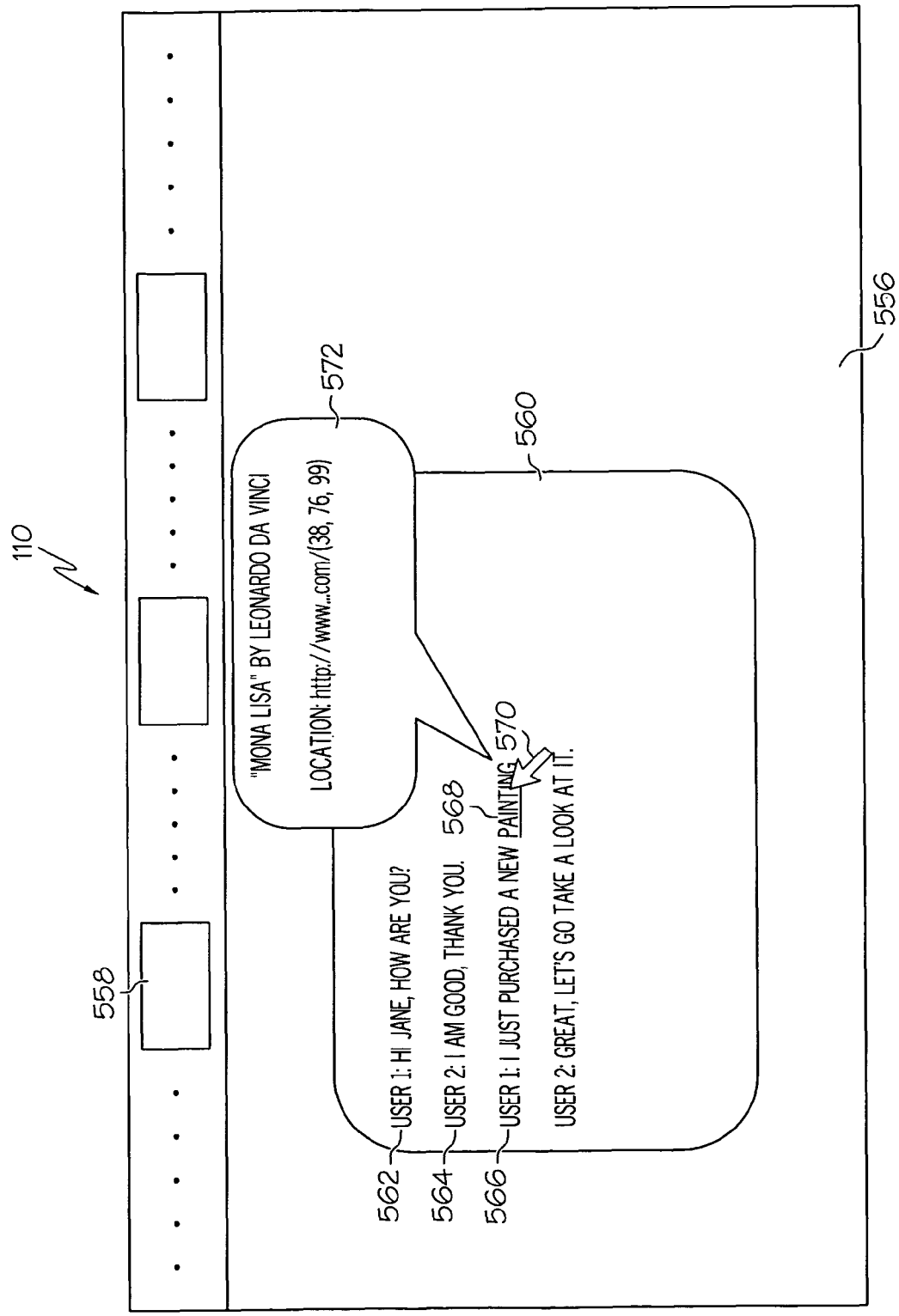
FIG. 5 is a block diagram of another virtual environment user interface for providing location information to a user according to one embodiment of the present invention.
Figure 6:
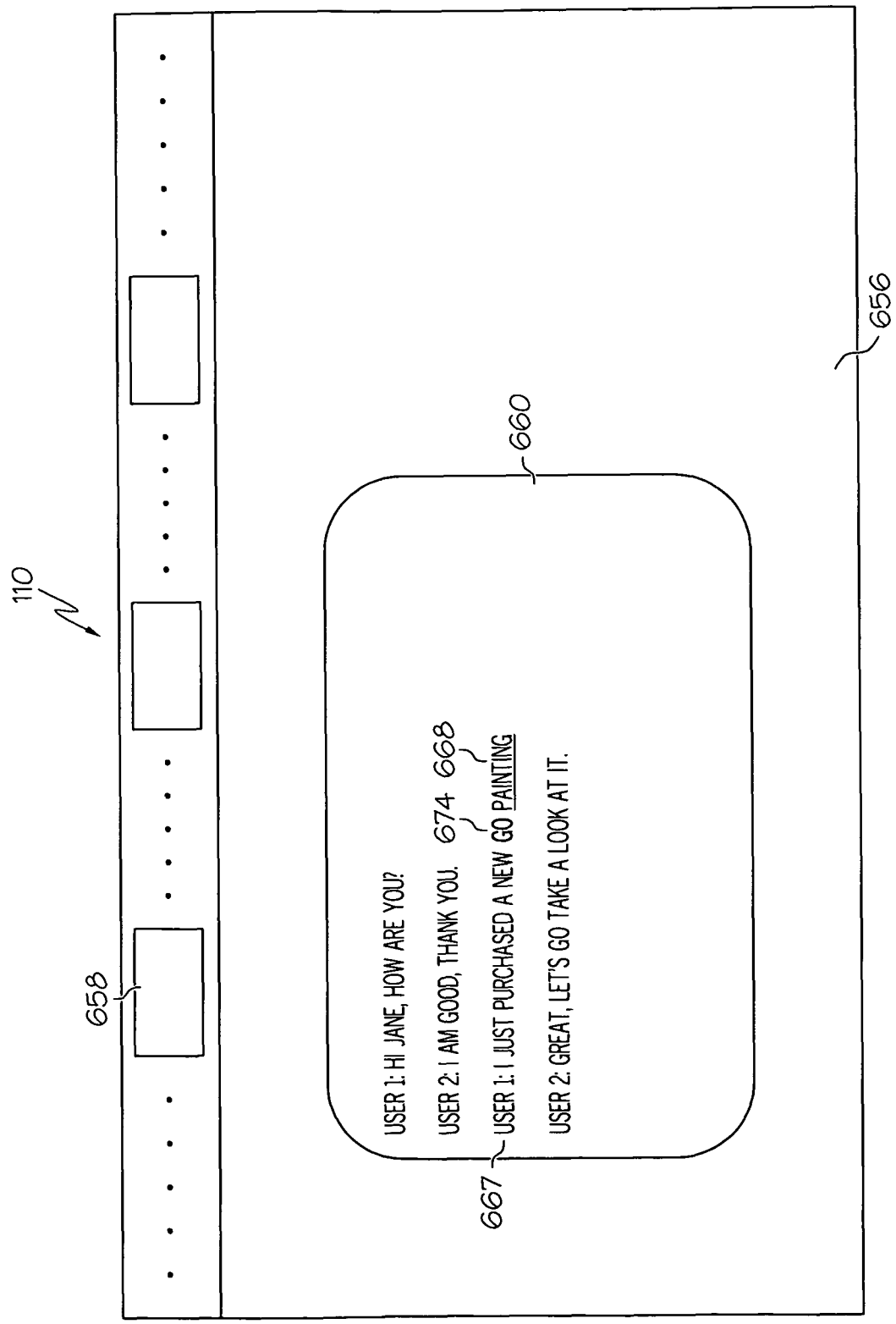
FIG. 6 is a block diagram of yet another virtual environment user interface for providing location information to a user according to one embodiment of the present invention.

FIGS. 4-6 shows examples of providing location based information to users of a virtual environment 114 according to the embodiments discussed above. In particular, FIG. 4 shows the virtual environment interface 110 according to one embodiment of the present invention. The virtual environment interface 110 includes a display area 456 that displays various aspects of the virtual environment 114 and allows the user to interact with the environment 114. The virtual environment interface 110 also includes one or more widgets 458 that can be located anywhere on the interface 110. These widgets provide various operations such as account settings, enabling/disabling the associative lookup function discussed above, and any other function that the creators of the virtual environment want to provide to a user through the interface 110.

FIG. 4 also shows a window 460 within the interface 110. In one embodiment, this widow is a communication window 460 similar to a chat window. In many virtual environments 114 users interact with one another via chat functions. It should be noted that the present invention is not limited to pop-up window as shown in FIG. 4. For example, a predefined static area can be defined within the interface 110 that is used to display chat sessions with another user. In the example of FIG. 4 a first user, User 1, is communicating with a second user, User 2.

As the users are chatting, the user interaction manager 116 monitors the characters being inputted by the users and cross references these characters to the associative lookup entries 120 in the database 118. For example, the user interaction manager 116 determines that User 1 is entering characters at 462. The user interaction manager 116 can locate the associative lookup entry 120 for User 1 and determine if any character sets at 462 match the keywords defined by User 1 in the associative lookup entry. As discussed above, a user can designate different regions in the associative lookup entry. If the user has done so, the user interaction manager 116 also identifies the region that User 1 is in.

The user interaction manager 116 does the same for User 2 at 464. It should be noted that the user interaction manager 116 monitors and cross references the character sets as the users input them. When the user interaction manager 116 identifies a character set that matches a keyword within the lookup entry associated with a user, the user interaction manager 116 links the location based information associated with that keyword as discussed above. For example, FIG. 4 at 464 shows that the user interaction manager 116 has identified "painting" to match a keyword in an associated lookup entry 120 for User 1. Therefore, the user interaction manager 116 has visually changed the character set "painting" according to the format defined by the user or by a default setting.

When User 2 (or User 1) clicks on "painting", the user is transported to the location given by the location information. It should be noted that the linked words can be configured to let any user click on the word or only the receiving user. For example, FIG. 4 shows the interface 110 from the viewpoint of User 1. When User 1 enters the line of text 466, the word "painting" becomes linked and selectable. However, since User 1 typed the line including the character set "painting" only User 2, in one embodiment, is able to select the word "painting". However, in another embodiment, both User 1 and User 2 can select the linked character set.

As discussed above, an associative lookup entry 120 can be associated with a region as compared to a user. In this situation, the user interaction manager 116 performs the same process as discussed above, but identifies an associative lookup entry 120 for the current region that users are in. For example, a user navigates his/her AVATAR into a region such as an art gallery. The user knows that her/she wants a painting with shades of blue in it to match a virtual sofa. The AVATAR is greeted by a sales clerk when he/she enters the gallery. The user chats with the clerk and lets the clerk know he/she is looking for a painting with shades of blue. The clerk responds "Oh, you should check out Peaceful Breeze, French Quarter Blues, and one of my favorite pieces is Violet River." Similar to the example discussed above, as the clerk and user are chatting, the user interaction manager 116 monitors the character sets being inputted. Because the user and clerk are within a specific region, i.e. an art gallery, the user interaction manager 116 cross references the character sets to an associative lookup entry 120 for the art gallery region.

In the current example, titles of paintings, among other things, are listed as keywords within the associative lookup entry. Therefore, the user interaction manager 116 links location information with each of these words and visually changes these character sets to indicate the linkage (e.g., the underlining format). A user can easily navigate to each of the listed paintings just by clicking on each of the character sets.

FIG. 5 shows another example of providing location to a user in a virtual environment 114. The example of FIG. 5 is similar to the example given in FIG. 4. For example, the virtual environment interface 110 includes a display area 556, widgets 558, and a window 560 that displays a communication session between users. The user interaction monitor 116 monitors the communication between users such as 562, 564, 566, and 568. The user interaction monitor 116 cross references character sets against an appropriate associated lookup entry 120 as discussed above. The user interaction monitor 116 identifies character sets in the char session that match keywords within the associative lookup entry 120.

However, in the example shown in FIG. 5 instead of automatically transporting a user that clicks on a linked character set such as "painting", as discussed in FIG. 4, a hover window 572 is displayed. In particular, the hover window 572 is displayed when a user places his/her cursor 570 over the linked word, e.g., "painting" in the example of FIG. 5. Location information such as http://www . . . .com/(38, 76, 99) can be displayed to the user. Other information that the user enters into the associative lookup entry can also be displayed, e.g. the title of the painting as shown in FIG. 5.

The hover window 572 can be displayed as the user places the cursor 570 over the linked word or when the user clicks on the linked word. Also, if the hover window 572 is configured to appear when a cursor 570 is placed over the linked word, the user can click on the word and be transported to the location associated with the linked word.

FIG. 6 shows another example of providing location to a user in a virtual environment 114. The example of FIG. 6 is similar to the example given in FIGS. 4 and 5. For example, the virtual environment interface 110 includes a display area 656, widgets 658, and a window 660 that displays a communication session between users. The user interaction monitor 116 monitors the communication between users. The user interaction monitor 116 cross references character sets against an appropriate associated lookup entry as discussed above and identifies information such as location information when a character set matches a keyword within the entry 120.

However, FIG. 6 shows that User 1 has entered a relocation indicator "go". It should be noted that although the relocation indicator "go" is shown as being in bold font, this is to only show the reader that "go" has an external purpose. Relocation indicators are not required to have a different visual appearance than other character sets within the window 660. Also, FIG. 6 shows the virtual environment interface 110 from the viewpoint of User 1. User 2, in one embodiment, does not see the relocation indicator "go". When User 2 (or User 1) selects the linked character set "painting", which has been linked to location information, both users are transported to the location indicated by the location information, as compared to only transporting the user who clicked on the linked word.

It should be noted that items, locations, and the like can change within the virtual environment 114. For example, a region may no longer exist or an item within a region may no longer exist. If a user has setup an associative lookup entry 120, the user has the option of updating the entry to add/remove keywords. So if a user gets rid of an item such as a virtual couch and that couch was associated with a keyword, the user can remove the corresponding keyword from the entry 120. Alternatively, the user interaction module 116 can monitor the environment for changes and automatically update the entries. For example, the manager 116 can automatically update the entry 120 for the user when the couch is removed from the user's virtual house.

In the example of the art gallery, if the user purchases one of the paintings, that painting is no longer able to be seen within the art gallery. Therefore, the manager 116 automatically updates the entry 120 associated with that region, e.g., art gallery, so that the keyword associated with that painting is removed. The manager 116 can be setup to analyze the regions at given intervals, on command, or in real-time. When the analysis is performed, the manager 116 takes an inventory of items within the region. The manager 116 compares the inventory to a previous inventory to determine if anything has changed and updates the entries 120 accordingly. The manager 116 can also notify an owner of an entry 120 such as a user so that the user can check the entry 120 and add/remove any needed listings.

Operational Flow for Providing Location Information in a Virtual Environment

Figure 7:
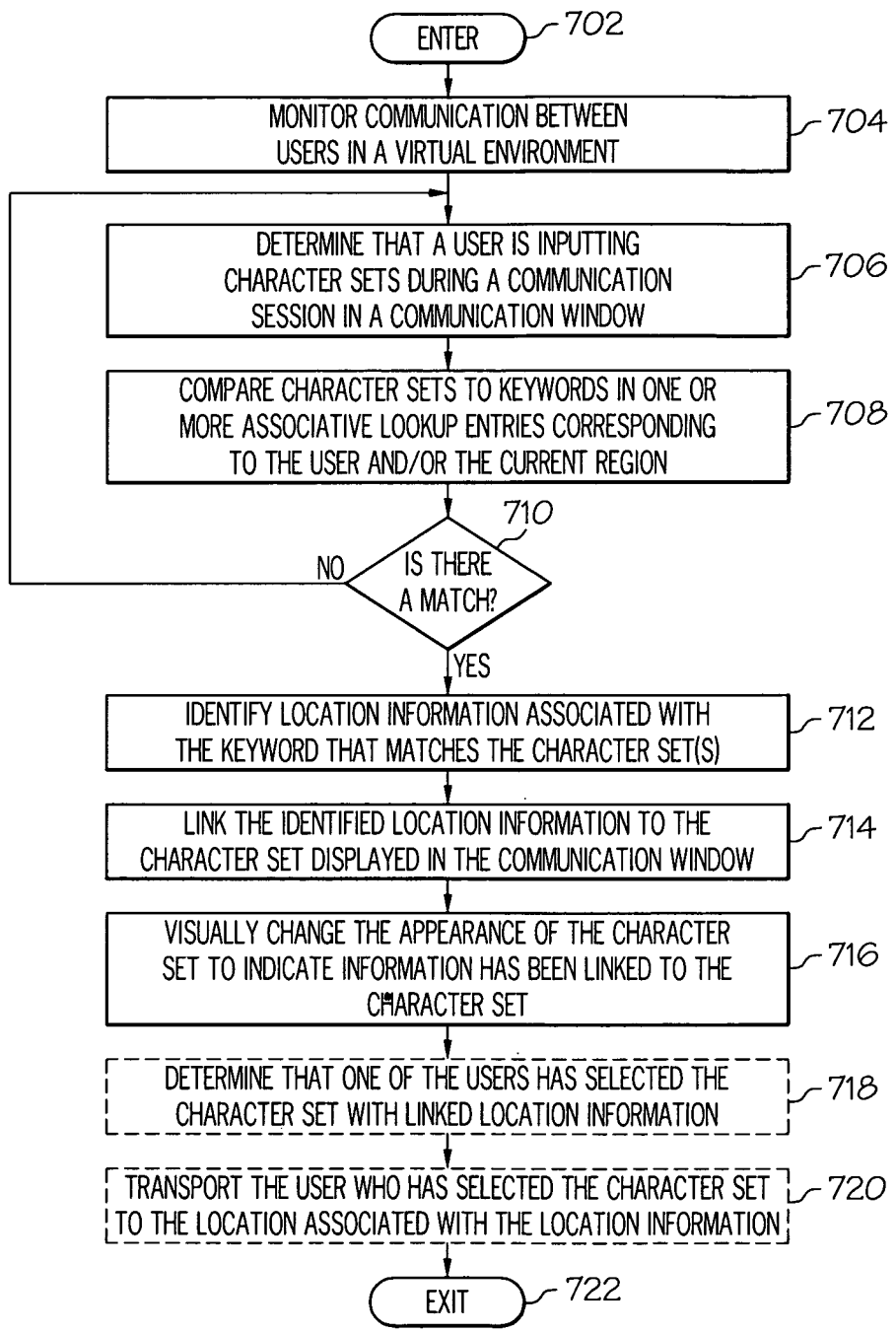
FIG. 7 is an operational flow diagram illustrating a process of providing location information to a user within a virtual environment according to one embodiment of the present invention.

FIG. 7 is an operational flow diagram illustrating one example providing location information to a user in a virtual environment. The operational flow diagram of FIG. 6 begins at step 602 and flows directly to step 604. The user interaction manager 116, at step 704, monitors communication between uses in the virtual environment 114. The manager 116, at step 706, determines a first user is inputting character sets during a communication session with at least a second user.

The manager 116, at step 708, compares the detected character sets to keywords in one or more associative lookup entries 120 corresponding to the first user and/or the current region of the virtual environment 114. The manager 116, at step 710, determines if there is a match. If the result of this determination is negative, the control flow returns to step 706. If the result of this determination is positive, the manager 116, at step 712, identifies location information associated with the keyword(s) that matches the character set(s).

The manager 116, at step 714, links the identified location information to the character set displayed in the communication window 460. The manager 116, at step 716, also visually changes the appearance of the character set to indicate that location information has been linked to the character set.

The manager 116, at step 718, determines that the second user (or the first user in another embodiment) has selected the character set with the linked location information. The second user, at step 720, is transported to the location associated with the location information. It should be noted that steps 718 and 720 are dashed to indicate that other actions can be performed at these steps. For example, the manager 118, at step 718, can determine that a user has placed his/her cursor 570 over the linked character set. The manager 116, at step 720, can then display the location information and other information in a hover window. Alternatively, the user, at step 706, can also add a relocation indicator before or after a character set. Therefore, the manager, at step 720, can relocate both user 1 and user 2 when user 2 selects the linked character set. The control flow then exits at step 722.

Example of an Information Processing System

Figure 8:
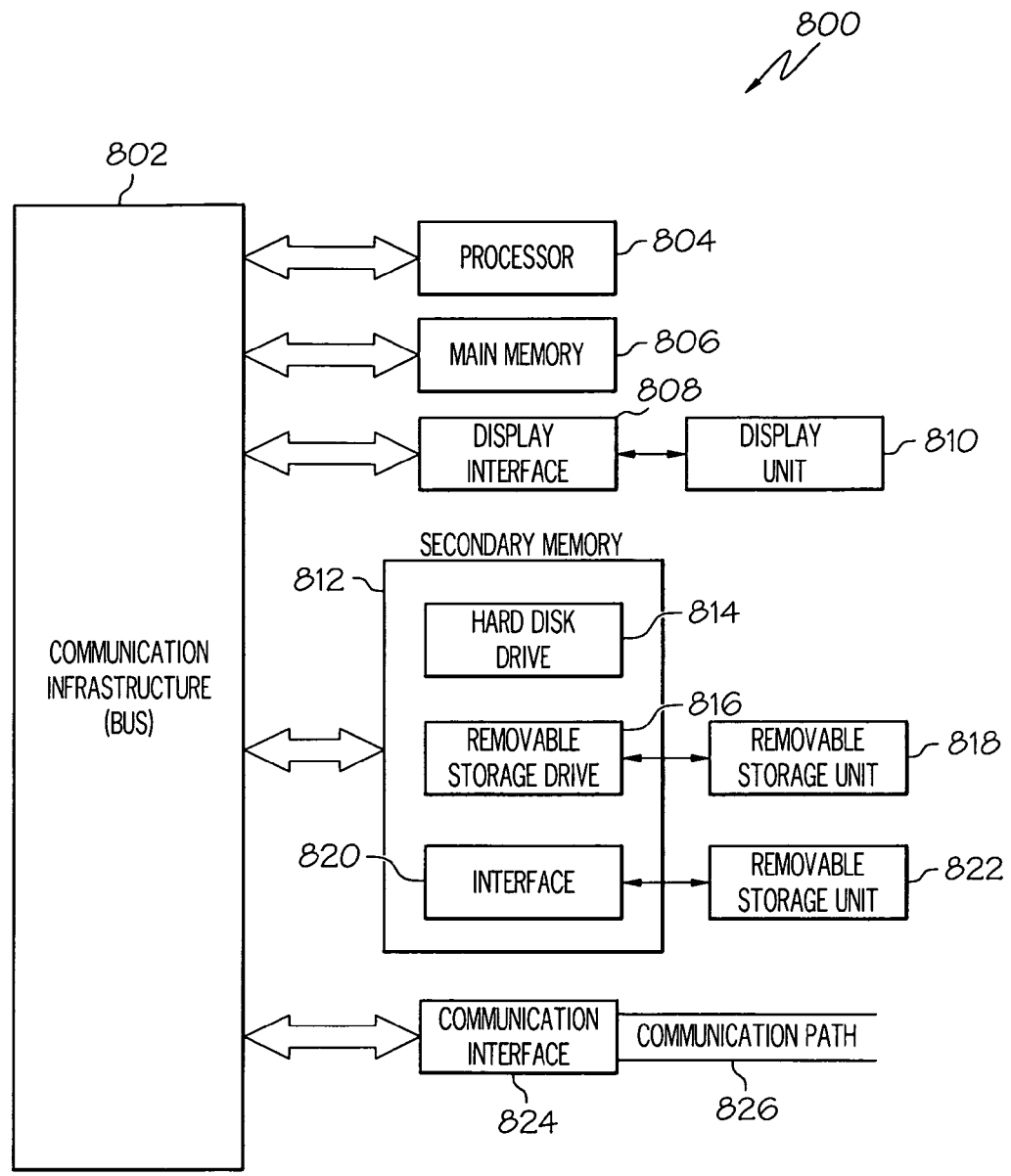
FIG. 8 is a block diagram illustrating a detailed view of an information processing system, according to one embodiment of the present invention.

FIG. 8 is a high level block diagram illustrating a more detailed view of a computing system 800 according to embodiments of the present invention. The computing system 800 is based upon a suitably configured processing system adapted to implement an exemplary embodiment of the present invention. For example, a personal computer, workstation, or the like, may be used.

In one embodiment of the present invention, the computing system 800 includes one or more processors, such as processor 804. The processor 804 is connected to a communication infrastructure 802 (e.g., a communications bus, crossover bar, or network). Various software embodiments are described in terms of this exemplary computer system. After reading this description, it becomes apparent to a person of ordinary skill in the relevant art(s) how to implement the invention using other computer systems and/or computer architectures.

The computing system 800 can include a display interface 808 that forwards graphics, text, and other data from the communication infrastructure 802 (or from a frame buffer) for display on the display unit 810. The computing system 800 also includes a main memory 806, preferably random access memory (RAM), and may also include a secondary memory 812 as well as various caches and auxiliary memory as are normally found in computer systems. The secondary memory 812 may include, for example, a hard disk drive 814 and/or a removable storage drive 816, representing a floppy disk drive, a magnetic tape drive, an optical disk drive, and the like. The removable storage drive 816 reads from and/or writes to a removable storage unit 818 in a manner well known to those having ordinary skill in the art.

Removable storage unit 818, represents a floppy disk, a compact disc, magnetic tape, optical disk, etc. which is read by and written to by removable storage drive 816. As are appreciated, the removable storage unit 818 includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer-readable information.

In alternative embodiments, the secondary memory 812 may include other similar means for allowing computer programs or other instructions to be loaded into the computing system 800. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computing system 800.

The computing system 800, in this example, includes a communications interface 824 that acts as an input and output and allows software and data to be transferred between the computing system 800 and external devices or access points via a communications path 826. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. The signals are provided to communications interface 824 via a communications path (i.e., channel) 826. The channel 826 carries signals and may be implemented using wire or cable, fiber optics, a phone line, a cellular phone link, an RF link, and/or other communications channels.

In this document, the terms "computer program medium," "computer usable medium," "computer readable medium", "computer readable storage product", and "computer program storage product" are used to generally refer to media such as main memory 806 and secondary memory 812, removable storage drive 816, and a hard disk installed in hard disk drive 814. The computer program products are means for providing software to the computer system. The computer readable medium allows the computer system to read data, instructions, messages or message packets, and other computer readable information from the computer readable medium.

Computer programs (also called computer control logic) are stored in main memory 806 and/or secondary memory 812. Computer programs may also be received via communications interface 824. Such computer programs, when executed, enable the computer system to perform the features of the various embodiments of the present invention as discussed herein. In particular, the computer programs, when executed, enable the processor 804 to perform the features of the computer system.

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The invention claimed is:

1. A method for providing location information to users in a virtual environment, the method comprising:

determining that a first user is communicating with a second user in a virtual environment, wherein the virtual environment comprises a plurality of virtual locations within a virtual world that are accessible by graphical representations of human users, wherein the graphical representations of human users are controllable by human users;

determining that one of the first user and the second user has entered a character set matching a keyword in a database entry;

identifying a set of location information associated with the keyword, wherein the set of location information indicates at least one virtual location in the plurality of virtual locations within the virtual environment;

linking the set of location information to the character set;

visually changing the character set to indicate to the first user and second user that set of location information has been linked to the character set, wherein the character set that has been visually changed is selectable by each of the first user and the second user;

determining that at least one of the first user and the second user has selected the character set that has been visually changed; and transporting at least one of a graphical representation of the first user and a graphical representation of the second user to the virtual location within the virtual environment corresponding to the set of location information.

2. The method of claim 1, further comprising:

determining that at least one of the first user and the second user has placed a cursor at least near the character set that has been visually changed;

displaying a window that hovers near the character set that has been changed; and displaying the set of location information in the window.

3. The method of claim 1, wherein determining that at least one of the first user and the second user has selected the character set that has been visually changed comprises determining that at least one of the first user and the second user has placed a relocation character set at least one of immediately before and immediately after the character set; and determining that the at least one of the first user and the second user has selected the character set that has been visually changed, and wherein the transporting comprises transporting both a graphical representation of the first user and a graphical representation of the second user to the virtual location corresponding to the set of location information in response to the character set being selected and the relocation character set being at least one of immediately before and immediately after the character set.

4. The method of claim 1, wherein determining that one of the first user and the second user has entered a character set matching a keyword in a database entry, further comprises:

analyzing a set of associative lookup entries in the database associated with one of the first user and the second user that has entered the character set, wherein the set of associative lookup entries comprises keywords defined by the one of the first user and the second user that has entered the character set.

5. The method of claim 1, wherein determining that one of the first user and the second user has entered a character set matching a keyword in a database entry, further comprises:
analyzing a set of associative lookup entries in the database associated with a region that one of the first user and the second user that has entered the character set is currently in, wherein the set of associative lookup entries comprises keywords associated with the region.

6. The method of claim 1, wherein linking the set of location information to the character set further comprising:
hyperlinking the set of location information to the character set.

7. An information processing system for hosting at least a portion of a virtual environment, comprising:
a memory;
a processor communicatively coupled to the memory;
at least a portion of a virtual environment; and
a user interaction manager communicatively coupled to the memory, the processor, and the at least a portion of the virtual environment, wherein the user interaction manager is configured to:
determine that a first user is communicating with a second user in a virtual environment, wherein the virtual environment comprises a plurality of virtual locations within a virtual world that are accessible by graphical representations of human users, wherein the graphical representations of human users are controllable by human users;
determine that one of the first user and the second user has entered a character set matching a keyword in a database entry;
identify a set of location information associated with the keyword, wherein the set of location information indicates at least one virtual location in the plurality of virtual locations within the virtual environment;
link set of location information to the character set;
visually change the character set to indicate to the first user and the second user that set of location information has been linked to the character set, wherein the character set that has been visually changed is selectable by each of the first user and the second user;
determine that at least one of the first user and the second user has selected the character set that has been visually changed; and
transport at least one of a graphical representation of the first user and a graphical representation of the second user to the virtual location within the virtual environment corresponding to the set of location information.

8. The information processing system of claim 7, wherein the user interaction manager is further configured to:
determine that at least one of the first user and the second user has placed a cursor at least near the character set that has been visually changed;
display a window that hovers near the character set that has been changed; and
display the set of location information in the window.

9. The information processing system of claim 7, wherein the user interaction manager is further configured to determine that at least one of the first user and the second user has selected the character set that has been visually changed by:
determining that at least one of the first user and the second user has placed a relocation character set at least one of immediately before and immediately after the character set; and
determining that the at least one of the first user and the second user has selected the character set that has been visually changed, and
wherein the user interaction manager is further configured to transport by transporting both a graphical representation of the first user and a graphical representation of the second user to the virtual location corresponding to the set of location information in response to the character set being selected and the relocation character set being at least one of immediately before and immediately after the character set.

10. The information processing system of claim 7, wherein the user interaction manager is further configured to determine that one of the first user and the second user has entered a character set matching a keyword in a database entry by:
analyzing a set of associative lookup entries in the database associated with one of the first user and the second user that has entered the character set, wherein the set of associative lookup entries comprises keywords defined by the one of the first user and the second user that has entered the character set.

11. The information processing system of claim 7, wherein the user interaction manager is further configured to determine that one of the first user and the second user has entered a character set matching a keyword in a database entry by:
analyzing a set of associative lookup entries in the database associated with a region that one of the first user and the second user that has entered the character set is currently in, wherein the set of associative lookup entries comprises keywords associated with the region.

12. The information processing system of claim 7, wherein the user interaction manager is further configured to link the set of location information to the character set by
hyperlinking the set of location information to the character set.

13. A non-transitory computer program product for providing location information to users in a virtual environment, the computer program product comprising:
a storage medium readable by a processing circuit and storing instructions for execution by the processing circuit for performing a method comprising:
determining that a first user is communicating with a second user in a virtual environment, wherein the virtual environment comprises a plurality of virtual locations within a virtual world that are accessible by graphical representations of human users, wherein the graphical representations of human users are controllable by human users;
determining that one of the first user and the second user has entered a character set matching a keyword in a database entry;
identifying a set of location information associated with the keyword, wherein the a set of location information indicates at least one virtual location in the plurality of virtual locations within the virtual environment;
linking the a set of location information to the character set;
visually changing the character set to indicate to the first user and second user that a set of location information has been linked to the character set, wherein the character set that has been visually changed is selectable by each of the first user and the second user;
determining that at least one of the first user and the second user has selected the character set that has been visually changed; and
transporting at least one of a graphical representation of the first user and a graphical representation of the second user to the virtual location within the virtual environment corresponding to the set of location information.

14. The non-transitory computer program product of claim 13, wherein the method further comprises:

determining that at least one of the first user and the second user has placed a cursor at least near the character set that has been visually changed;

displaying a window that hovers near the character set that has been changed; and displaying the set of location information in the window.

15. The non-transitory computer program product of claim 13, wherein determining that at least one of the first user and the second user has selected the character set that has been visually changed comprises:

determining that at least one of the first user and the second user has placed a relocation character set at least one of immediately before and immediately after the character set; and determining that the at least one of the first user and the second user has selected the character set that has been visually changed, and wherein the transporting comprises transporting both a graphical representation of the first user and a graphical representation of the second user to the virtual location corresponding to the set of location information in response to the character set being selected and the relocation character set being at least one of immediately before and immediately after the character set.

16. The non-transitory computer program product of claim 13, wherein determining that one of the first user and the second user has entered a character set matching a keyword in a database entry further comprises:

analyzing a set of associative lookup entries in the database associated with one of the first user and the second user that has entered the character set, wherein the set of associative lookup entries comprises keywords defined by the one of the first user and the second user that has entered the character set.

17. The non-transitory computer program product of claim 13, wherein determining that one of the first user and the second user has entered a character set matching a keyword in a database entry further comprises:

analyzing a set of associative lookup entries in the database associated with a region that one of the first user and the second user, that has entered the character set, is currently in, wherein the set of associative lookup entries comprises keywords associated with the region.

* * * * *